(12) United States Patent
Raman et al.

(10) Patent No.: US 6,910,078 B1
(45) Date of Patent: Jun. 21, 2005

(54) METHODS AND APPARATUS FOR CONTROLLING THE TRANSMISSION OF STREAM DATA

(75) Inventors: Suchitra Raman, Winchester, MA (US); James W. O'Toole, Jr., Somerville, MA (US)

(73) Assignee: Cisco Technology, Inc., San Jose, CA (US)

( * ) Notice: Subject to any disclaimer, the term of this patent is extended or adjusted under 35 U.S.C. 154(b) by 758 days.

(21) Appl. No.: 10/002,580

(22) Filed: Nov. 15, 2001

(51) Int. Cl.[7] .............................................. G06F 15/16
(52) U.S. Cl. ...................................................... 709/231
(58) Field of Search ................................. 709/223, 227, 709/231; 714/2, 18, 48

(56) References Cited

U.S. PATENT DOCUMENTS

| | | | |
|---|---|---|---|
| 6,259,706 B1 * | 7/2001 | Shimada | 370/466 |
| 6,425,001 B2 * | 7/2002 | Lo et al. | 709/217 |
| 6,430,711 B1 * | 8/2002 | Sekizawa | 714/47 |
| 6,490,641 B2 * | 12/2002 | Whetsel | 710/104 |
| 6,519,223 B1 * | 2/2003 | Wager et al. | 370/216 |

OTHER PUBLICATIONS

Network Working Group; H. Schulzrinne; Real Time Streaming Protocol (RTSP); http://www.ietf.org/rfc/rfc2326.txt; Oct. 15, 2001; 73 pages.

* cited by examiner

Primary Examiner—David Y. Eng
(74) Attorney, Agent, or Firm—Barry W. Chapin, Esq.; Chapin & Huang, LLC

(57) ABSTRACT

Mechanisms and techniques provide a system that provides stream data to a client by monitoring operation of a stream control protocol such as RTSP associated with stream data transmitted between a client and a first stream server. The system detects a stream change event related to transmission of the stream data between the client and the first stream server and identifies a relative position within the stream data based on the operation of the stream control protocol. The system then establishes transmission of the stream data between the client and a second stream server starting at the relative position in the stream data. The system provides for mid-stream failover for the transmission of stream data such as real-time data with minimal perceptible loss of stream data by the client.

30 Claims, 7 Drawing Sheets

METHODS AND APPARATUS FOR CONTROLLING THE TRANSMISSION OF STREAM DATA

BACKGROUND OF THE INVENTION

Computer and information networks such as the Internet allow computer systems to exchange streams of data such as audio data, video data, multimedia data or other stream data between software applications that operate on such computer systems. As an example, a user controlling a web browser operating on a client computer system can select a hyperlink that references audio stream data that an audio stream server computer system can serve to the client computer system over the Internet. In response to such a selection, the web browser can invoke an audio player software application that operates in conjunction with the web browser on the client computer system. The audio player software application can communicate with the audio stream server software application operating on the audio stream computer system in order to establish an audio stream data connection between the client computer system and the audio server. Once such a connection is established, the audio stream server can begin serving or streaming the audio stream data back to the audio player software application operating on the client computer system. The audio player software application can then receive and play the audio data through speakers coupled to the client computer system for the enjoyment of the user.

Due to the real-time or near real-time nature of audio data, video data, multimedia data or other such data, the audio player software application and audio stream server software application may utilize one or more real-time or near real-time data transfer communication or control protocols in order to appropriately control the flow of streaming data from the stream server to the client computer system. An example of such a real-time data transfer communications or control protocol is the Real Time Streaming Protocol (RTSP). Other such protocols exist as well. Generally, RTSP is an application-level protocol for control over the delivery of data with real-time properties such as audio data, video data, and the like. RTSP provides a framework to establish and control one or more time-synchronized streams of continuous media such as audio and video stream data supplied from a stream server to a client computer system. RTSP does not typically deliver or carry the continuous stream data itself, but rather operates as a set of out-of-band messages or requests that can be exchanged between the client and a stream server in order to control and synchronize delivery of the stream data. In other words, RTSP operates as a "network remote control" for multimedia servers.

According to the general operation of RTSP, the client and a stream server exchange RTSP requests in order to adjust characteristics of the flow of stream data served from the stream server to the client. As an example, a client may send an RTSP "PLAY" request specifying an offset, play time, location or absolute position in the stream data at which to begin playing or serving the stream data. The stream server receives the RTSP PLAY request and begins serving the stream data at the requested play time. During receipt of the stream data, the client may determine a requirement to alter a transmission characteristic of the stream data such as, for example, to increase or decrease the bandwidth or rate at which the stream server serves the stream data, or to seek forward in the stream data to a desired offset (referred to as absolute positioning). As an example, the client may detect that the stream server needs to serve the stream data at a higher bandwidth or rate in order for the client to be able to reproduce the stream data for the user in a realistic or real-time manner or at a better quality of service. In response, the client may send an RTSP message to increase the rate at which the stream server serves the stream data. This RTSP message or request propagates through the network (i.e., through a series of one or more data communications devices such as switches and routers) until it reaches the stream server and which point the stream server adjusts the bandwidth at which the stream data is served according to the RTSP bandwidth adjustment message.

As another example, if the user operating the client desires to rapidly advance forward or backward within the content of the stream data, the user may operate fast-forward or rewind buttons provided by the audio client software application (e.g., via a graphical user interface) which causes the client to issue one or more RTSP requests to the stream server that each specify a particular incremented offset or absolute position within the stream data at which the server is to begin serving the stream data. The offset or absolute positions are relative to the beginning of the stream data. Accordingly, if the user depresses and holds a "FAST FORWARD" graphical user interface button provided by the client receiving the stream data, the client will issue a series of RTSP play requests each containing successively incremented absolute position values. Upon receipt of each of such RTSP play requests, the stream server begins serving stream data at the indicated absolute or relative position in the stream data until the next request is received to provide the appearance to the user of rapidly playing or advancing into the stream data.

For complete details on the operation of RTSP, the reader is directed to Request For Comment 2326 (RFC-2326) which is a document maintained by the Internet Engineering Task Force (IETF) that specifies an Internet standards track protocol for RTSP. The teaching and contents of the RFC-2326 document are hereby incorporated by reference herein in their entirety.

Other conventional data transfer communications protocols can carry out the processing and messaging required to carry or transport the actual stream data. As an example, the Real Time Protocol (RTP) can be used as a transport mechanism to propagate real-time stream data through a computer network. The RTP protocol encodes the real-time stream data into a packet and includes sequencing and/or timing information into the data such as virtual time fields that allow a recipient to identify how the portions of stream data in one RTP encoded packet relate to other portions of stream data in other RTP packets. In other words, RTP can encode data with timing information about the media thus providing a reference to the recipient for how the media can be played back.

SUMMARY OF THE INVENTION

Conventional techniques for controlling the transmission of stream data suffer certain deficiencies. One such deficiency is that such conventional techniques do not provide mid-stream failover of the transmission of stream data in the event that a stream server serving the stream data becomes incapable of serving the stream data as requested by a client. As an example, if a first stream server is operating to serve stream data to a client and the first stream server experiences a failure or becomes overloaded, conventional streaming or real-time stream control protocols such as RTSP provide no mechanisms to allow the client to begin receiving the stream data originally served from the first stream server from a second stream server at an offset, absolute or relative position, or time into the stream data at which point the failure of the first stream server occurred. As a specific example, suppose a client is receiving stream data for one and a half minutes, thus amounting to one-half of a three minute multimedia presentation. Further suppose that at the one minute and thirty second point in this presentation, the stream server serving such stream data fails. Conventional real-time data transfer stream control protocols provide no mechanism to automatically establish a second connection with another stream server and to instruct the other stream server to commence serving the same stream data multimedia presentation to the same client at the same point in time in the multimedia presentation (i.e., one minute and thirty seconds) at which the first stream server left off (i.e., at the failure time).

Embodiments of the present invention significantly overcome the aforementioned deficiencies that arise in conventional systems transmitting of stream data such as realtime audio or video data. In particular, embodiments of the invention provide a failover manager that operates within a data communications device such as a switch or router. The failover manager is able to monitor a stream control protocol such as RTSP that controls one or more flows of stream data that are transmitted between a first stream server computer system and a client computer system over a computer network in which the data communications device resides. The failover manager operating within the data communications device is also capable of detecting a stream change event such as the failure or incapacity of the first stream server to effectively serve the stream data to the client computer system. Upon detecting such a stream change event, the failover manager can identify a relative position within the stream data based on the monitored operation of the stream control protocol. Also in response to detecting the stream change event, the failover manager can establish transmission of the stream data between a second stream server and the client computer system beginning at the relative position within the stream data corresponding to the point or time in transmission of the stream data of the stream change event. As a result of this operation, the failed transmission of stream data from the first stream server to the client computer system is patched back to, or resumed, between a second stream server and the client computer system with a minimum disruption of service (or possibly no perceptible disruption) to the end-user of the client computer system.

Conventional techniques for managing the transmission of stream data between a client and stream server computer system do not provide such mid-stream failover recovery capability. Instead, for the client computer system that operates in a computer network environment that is absent embodiments of the invention, the user of the client computer system must manually request to receive the stream data again from a non-failed stream server. In addition to having to supply such a request, the client computer system using a conventional stream control protocol such as RTSP provides no way of remembering or knowing exactly where in the former transmission of stream data the failure of the first stream server occurred. Accordingly, it would be up to the user of the client computer system to attempt to fast forward to the beginning of the stream data to an approximate point at which the failure occurred in the former transmission of the stream data in order to resume enjoyment of the stream data at that location.

In particular, embodiments of the invention provide methods and apparatus for providing stream data to a client. One such method embodiment comprises the steps of monitoring operation of a stream control protocol associated with stream data transmitted between a client and a first stream server. As explained in the general description above, one such stream control protocol may be RTSP protocol messages transferred between a client and the first stream server. By monitoring the operation of the stream control protocol, a data communications device operating such a method embodiment of the invention is capable of tracking, determining or otherwise ascertaining the current stream state of the stream data transmitted between a client in the first stream server. This method embodiment also detects a stream change event related to transmission of the stream data between the client and the first stream server. Such a stream change event may be, for example, detecting a failure of the ability of the first stream server to transmit the stream data to the client or detecting that the first stream server indicates an overload of serving stream data thus indicating that transmission of the stream data should be migrated from the first stream server to another (i.e., a second) stream server capable of handling transmission of the stream data to the client. In response to detecting the stream change event, this embodiment identifies a relative position within the stream data based on the monitored operation of the stream control protocol. The relative position can be, for example, a time such as a normal play time, offset, absolute position, or other time position or location indicator identifying a point within the stream data at which the stream change event occurred. Once the relative position is determined, this embodiment of the invention then establishes transmission of the stream data between the client and a second stream server starting at the relative position in the stream data.

Using such techniques, embodiments of the invention are able to hand off transmission of stream data that initially takes place between a first stream server and a client to a second stream server and the client in response to a stream change event.

According to another embodiment of the invention the step of monitoring operation of a stream control protocol comprises the steps of intercepting a stream adjustment message of the stream control protocol. The stream adjustment message indicates an adjustment to a transmission characteristic of the stream data. Examples of stream adjustment messages are RTSP messages and RTP or other encoding information contained within a packet of stream data. The method also updates a stream state associated with the stream data based on the stream adjustment message. Such a stream adjustment message can be any stream control protocol message that would cause a stream server to alter transmission of the stream data. Examples can include play messages, bandwidth adjustment message is or other types of stream control protocol messages which a stream server can use to adjust transmission of stream data on behalf of a client receiving the stream data.

According to another embodiment of the invention, the step of identifying a relative position within the stream data comprises the step of calculating the relative position within the stream data based on the updated stream state. The relative position indicates a current location (e.g., failure location) in the stream data relative to a predetermined location in the stream data (e.g., relative to the start or beginning of the stream data) and corresponds to a position in the stream data at which to begin transmission between the client and the second stream server upon establishing transmission of the stream data between the client and a second stream server. In this manner, transmission of the same stream data from the second stream server begins at a position in the stream data substantially equivalent to the position in the stream data at which point the stream change event occurred, and thus the second stream server begins serving the stream data to the client without a significantly perceptible change from the client perspective of receipt of the stream data.

In yet another embodiment of the invention, the stream adjustment message includes relative position information. As an example, relative position information may be piggybacked within a stream adjustment message being transmitted from a stream server back to the client, such as an acknowledgment. Also in such an embodiment, the step of updating a stream state includes the steps of storing the relative position information in the stream state associated with the stream data.

In another embodiment of the invention, the steps of identifying a relative position within the stream data and establishing transmission of the stream data between the client and a second stream server are performed in response to the step of detecting a stream change event related to the first stream server. This may be the failure of the first stream server for example. Also in this embodiment, the relative position within the stream data is a normal play time of the stream data identifying a time position within the stream data at which the step of establishing transmission of the stream data causes transmission of the stream data to be resumed between the client and the second stream server.

In still another embodiment, the stream adjustment message is a current stream adjustment message that indicates a bandwidth adjustment to a bandwidth of transmission of the stream data between the client and the first stream server. In example of a bandwidth adjustment is a request to increase or decrease bandwidth sent from a client to the first stream server using a stream control protocol such as RTSP. Another example of a stream adjustment message indicating a bandwidth adjustment might simply be to begin playing or to fast forward or rewind a specific location within the stream data In this embodiment, the step of updating a stream state associated with the stream data comprises the steps of calculating a current amount of stream data transmitted between the client and the first stream server from a time between receipt of a former stream adjustment message until receipt of the current stream adjustment message. In other words, the current amount stream data represents a distance or new location into the stream data which has transpired overtime (e.g., due to the stream data being played play time period) since the last or most recent or former stream adjustment message. Using this information, this embodiment of the invention also calculates a current normal play time associated with the stream data based on the current amount of stream data and a value of a bandwidth adjustment of the former stream adjustment message. The current normal play time identifies a time, location, offset, position or other indicator of an amount of stream data that has been played or served during a time it has passed between the current stream adjustment message and a stream adjustment message received prior to the current stream adjustment message (e.g., the most recent former stream adjustment message). This method embodiment then adds the current normal play time to a cumulative normal play time maintained within the stream state associated with the stream data and stores the cumulative normal play time in the stream state associated with the stream data. In this manner, each stream adjustment message detected during operation of monitoring the stream control protocol causes the failover manager operating within the data communications device configured according to this embodiment of the invention to track a position, time, offset, location or other indicator, referred to herein as the normal play time, within the stream data.

In another embodiment of the invention, the steps of identifying a relative position within the stream data and establishing transmission of the stream data between the client and a second stream server are performed in response to the step of detecting a stream change event related to the first stream server. In such an embodiment, the step of calculating the relative position within the stream data based on the updated stream state comprises the steps of calculating a current amount of stream data transmitted between the client and the first stream server from a time between receipt of the current stream adjustment message until detection of the stream change event. In other words, this calculation operation determines how much stream data has been played or served since the time of the most recent stream adjustment message and the occurrence of the stream change event. This embodiment then calculates a current normal play time associated with the stream data based on the current amount of stream data and a value of a bandwidth adjustment of the current stream adjustment message. Generally, the current normal play time represents an amount of play time of the stream data that has transpired between receipt of the most recent stream adjustment message and detection of the stream change event. This embodiment then adds the current normal play time to the cumulative normal play time to produce the relative position with the stream data. The relative position thus reflects an elapsed time position within the stream data that coincides with the stream change event. This is the normal play time at which the second stream server should resume serving the stream data to the client.

In another embodiment of the invention, the step of establishing transmission of the stream data between the client and a second stream server starting at the relative position in the stream data comprises the steps of identifying a second stream server that can handle transmission of the stream data with the client. Once identified, this embodiment of the invention provides a stream establishment message to the second stream server. The stream establishment message indicates that the second stream server is to establish transmission of the stream data between the client and the second stream server beginning at the relative position in the stream data. In this manner, the client begins receiving the stream data at the point of the stream change event such as a failure of the first stream server, without requiring the client to intervene in any manner.

In another embodiment of the invention, the stream data is transmitted from the first stream server to the client the step of detecting a stream change event comprises the step of detecting a failure of the ability of the first stream server to transmit the stream data to the client. In alternative embodiment of the invention, the step of detecting a stream change event comprises the step of detecting that the first stream server indicates an overload of serving stream data. In this embodiment, the steps of identifying a relative position within the stream data and establishing transmission of the stream data between the client and a second stream server cause the transmission of stream data to be migrated from between the client and the first stream server to between the client and the second stream server.

In still another embodiment of the invention, the step of detecting a stream change event comprises the step of detecting a stream change indicator within the stream data transmitted between the client and the first stream server. In such an embodiment, the stream change indicator may be embedded within the stream data itself and a data communications device such as a layer five switch which is capable of examining the content of the stream data in order to detect a stream change indicator which signals a stream change event causing operation of embodiment of the invention to migrate transmission of stream data from between the client and the first stream server to between the client and the second stream server.

In another embodiment of the invention, the steps of calculating a current amount of stream data transmitted between the client and the first stream server comprise the step of calculating an amount of stream data transmitted between the client and the first stream server while accounting for overhead conditions in the stream data. As such, the relative position indicating the normal play time within the stream data can be accurate so as to cause transmission of the stream data from the second stream server at an accurate location within the stream data.

In a further embodiment, the stream data comprises multiple flows of data and wherein the step of identifying a relative position within the stream data comprises the step of identifying respective relative positions within the stream data for each flow of data. In other words, embodiment of the invention can apply in situations where there are multiple flows of stream data under control of one or more stream control protocol flows.

In yet another embodiment of the invention, the stream data is real time data transmitted from the first stream server to the client and the stream control protocol is a real time data transfer control protocol capable of allowing the client and the first stream server to control the flow of the stream data such that the client can receive the stream data from the first stream server in a real-time manner. In example of such a stream control protocol is RTSP. Also this embodiment, the steps of monitoring, detecting, identifying and establishing are performed to i) allow a stream change event to cause transmission of the stream data to switch between the first stream server and the client to the second stream server and the client; and ii) to begin transmission of the stream data from the second stream server to the client at the relative position which corresponds approximately to a time location in the stream data that corresponds to the stream change event.

Other embodiments of the invention include a computer system, such as a data communications device, computerized device, or other device configured with software and/or circuitry to process and perform all of the method operations noted above and disclosed herein as embodiments of the invention. In such embodiments, the device, such as a data communications device, comprises one or more communications interfaces (e.g., network interfaces), a memory (e.g., any type of computer readable medium, storage or memory system), a processor and an interconnection mechanism connecting the communications interface, the processor and the memory. In such embodiments, the memory system is encoded with a failover manager application that when performed on the processor, produces a failover manager process that causes the computer system to perform any and/or all of the method embodiments, steps and operations explained herein as embodiments of the invention. In other words, a computer, switch, router or other device that is programmed or otherwise configured to operate as explained herein is considered an embodiment of the invention.

Other arrangements of embodiments of the invention that are disclosed herein include software programs to perform the method embodiment steps and operations summarized above and disclosed in detail below. As an example, a data communications device software control application, such as a data communications device operating system configured to operate as explained herein is considered an embodiment of the invention. More particularly, a computer program product is disclosed which has a computer-readable medium including computer program logic encoded thereon that, when executed on at least one processor with a computerized device, causes the processor to perform the operations (e.g., the methods) indicated herein as embodiments of the invention. Such arrangements of the invention are typically embodied as software, logic instructions, code and/or other data (e.g., data structures) arranged or encoded on a computer readable medium such as an optical medium (e.g., CD-ROM), floppy or hard disk or other a medium such as firmware or microcode in one or more ROM or RAM or PROM chips or as an Application Specific Integrated Circuit (ASIC). These software or firmware or other such configurations can be installed onto a computer system, data communications device or other device to cause such a device to perform the techniques explained herein as embodiments of the invention.

Embodiments of the invention also include computer program products such as disks, or other readable media that have a computer-readable medium including computer program logic encoded thereon for controlling transmission of stream data between the client and stream servers in a networked computer environment, such that the computer program logic, when executed on at least one processing unit with the computerized device, causes the at least one processing unit to perform any or all of the aforementioned methods.

The methods embodiments of the invention may be implemented by computer software and/or hardware mechanisms within a data communications device apparatus. It is to be understood that the system of the invention can be embodied strictly as a software program, as software and hardware, or as hardware alone. The features of the invention, as explained herein, may be employed in data communications devices and other computerized devices and software systems for such devices such as those manufactured by Cisco Systems, Inc. of San Jose, Calif.

BRIEF DESCRIPTION OF THE DRAWINGS

The foregoing and other objects, features and advantages of the invention will be apparent from the following more particular description of embodiments of the invention, as illustrated in the accompanying drawings and figures in which like reference characters refer to the same parts throughout the different views. The drawings are not necessarily to scale, with emphasis instead being placed upon illustrating the embodiments, principles and concepts of the invention.

DETAILED DESCRIPTION OF EMBODIMENTS

Embodiments of the invention provide a failover manager that operates within a data communications device such as a switch or router or another computerized device in a computer or data communications network. The failover manager, which may be embodied as software, hardware, or a combination thereof, is able to monitor a stream control protocol such as RTSP that controls one or more flows of stream data that are transmitted between a client computer system and a first stream server computer system over a computer network in which the data communications device resides. The failover manager operating is also capable of detecting a stream change event such as the failure or incapacity of the first stream server to effectively serve the stream data to the client computer system. Upon detecting such a stream change event, the failover manager can identify a relative position within the stream data based on the monitored operation of the stream control protocol. Also in response to detecting the stream change event, the failover manager can establish transmission of the stream data between a second stream server and the same client computer system beginning at the relative position within the stream data corresponding to the point or time in transmission of the stream data at which the stream change event occurred. As a result of this operation, the failed transmission of stream data from the first stream server to the client computer system is patched back to or resumed between a second stream server and the client computer system with a minimum disruption of service (or possibly no perceptible disruption) to the end-user of the client computer system.

Figure 1:
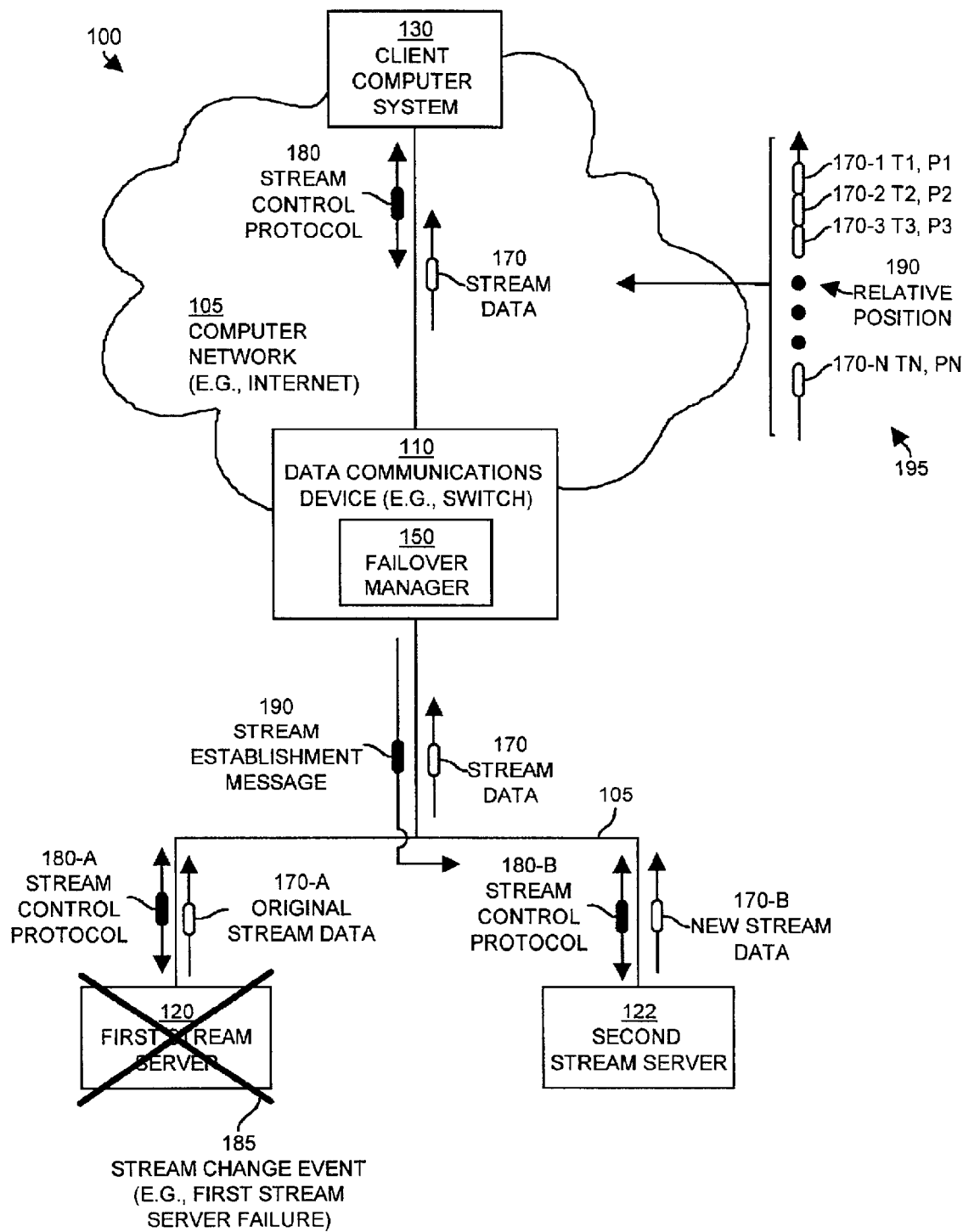
FIG. 1 illustrates an example computing system environment including a data communications device operating a failover manager configured to operate according to embodiments of the invention.

FIG. 1 illustrates a computing system environment 100 configured to operate according to one embodiment of the invention. The computing system environment includes a computer network 105 that interconnects a data communications device 110 including a failover manager 150 configured according to embodiments of the invention, a first stream server 120, a second stream server 122 and a client computer system 130. The client computer system 130 can communicate with the first stream server 120 using a stream control protocol 180 such as RTSP in order to initiate the transmission of stream data 170 served from the first stream server 120 to the client computer system 130 (e.g., to a client software application executing within the client computer system). The portions of stream data 170 that the first stream server 120 serves to the client computer system 130 are shown as original stream data 170-A.

As indicated in detail at location 195, each portion of stream data 170-1 through 170-N has a relative position 190 as indicated by time identifiers T1 through TN and position identifiers P1 through PN. These identifiers are shown in this illustration to convey that the stream data 170 has an order based on time or position (one or both). As an example, the portion of stream data 170-1 is transmitted from the first stream server 120 to the client computer system 130 and has a corresponding time position T1, P1. Each successive portion of stream data 170-2 through 170-N transmitted thereafter has successively increasing time and position identifiers which reflect progression of time (e.g., in seconds) or offset (e.g., byte position from the start) into the transmission or playback of the stream data 170 between the first stream server 120 in the client computer system 130. Stated in another manner, each byte of data within a packet of stream data has a relative position within the stream data.

During initial operation of the system illustrated in FIG. 1, and as will be explained in more detail shortly, the first stream server 120 begins serving the stream data 170 (i.e., original stream data 170-A) to the client computer system 130 according to commands or requests (e.g., RTSP requests) within the stream control protocol 180 (as provided by the client. At some point during this ongoing serving operation, a stream change event 185 occurs which, in this example, is shown as the failure of the first stream server 120, as indicated by the intersecting lines covering the first stream server 120. Other types of stream change events may occur that do not involved a total failure of a stream server. In response to the stream change event 185, the failover manager 150 operating within the data communications device 110 detects the stream change event 185 and transmits a stream establishment message 190 to the second stream server 122 in order for the second stream server 122 to begin serving the stream data 170 (i.e., the stream data 170-B) to the client computer system 130 at a relative position 192 that corresponds to a respective relative time T1 through TN (e.g., a normal play time) or a position P1 through PN (e.g., a byte offset into the stream data from the beginning of the stream data) at which the first stream server 120 would have continued had the stream change event 185 not occurred. In other words, the stream establishment message 190 identifies a relative position 192 within the stream data at which the second stream server 122 is to begin serving the stream data 170 to the client computer system 130.

The event or failure detection processing performed by the failover manager 150 configured according to embodiments of the invention enables the client computer system 130 to continue receiving the stream data 170 without a noticeable or perceptible break in the sequence of portions of stream data 170. As an example, if the first stream server 120 served stream data portion 170-3 and then experienced the stream change event 185 such as a failure, the failover manager 150 operating within the data communications device 110 is able to operate according to embodiments of the invention to keep track of the stream state of the stream data 170 based on the stream control protocol 180 and is therefore aware or has knowledge of and can compute the current relative position 192 corresponding to the stream data portion 170-3 that was most recently served from the first stream server 120 to the client computer system 130. Accordingly, using this relative position information 192, the failover manager 150 can provide a stream establishment message 190 to the second stream server 122 to allow the second stream server 122 to begin serving the stream data 170 beginning at the stream data portion 1704, which corresponds to the relative position 192 within the stream data 170 at which point the stream change event 185 caused failure of transmission from the first stream server 120.

In this manner, a data communications device 110 such as a switch or a router within the computer network 105 equipped with a failover manager 150 configured according to embodiments of the invention is able to provide mid-stream failover of stream data 170, which may be real-time stream data, on behalf of the client computer system 130 receiving the stream data 170.

Further details of the operation of the failover manager 150 configured according to embodiments of the invention will now be explained with respect to the flow chart of processing steps illustrated in FIG. 2.

Figure 2:
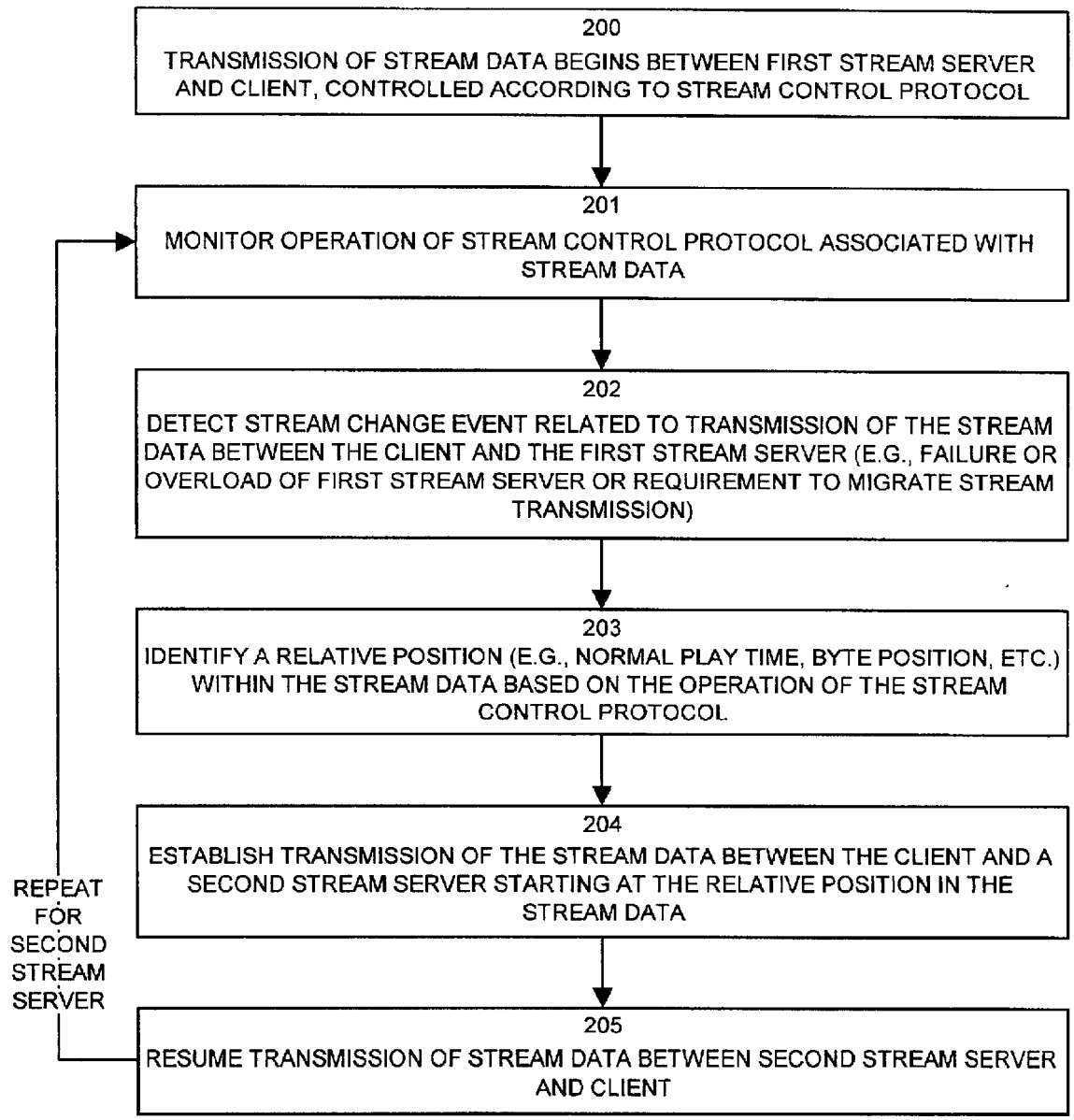
FIG. 2 is a flow chart of processing steps performed by a data communications device equipped with a failover manager configured according to one embodiment of the invention.

FIG. 2 illustrates a flow chart of processing steps as performed by the data communications device 10 equipped to operate a failover manager 150 configured according to embodiments of the invention. The processing steps of FIG. 2 will be explained with respect to the example explained above with respect to FIG. 1.

In step 200, transmission of the stream data 170 begins between the first stream server 120 and the client computer system 130 and is controlled according to the stream control protocol 180. As noted above, the stream control protocol 180 may be RTSP for example, and can allow the client 130 to provide stream adjustment messages 180 (i.e., which operate collectively as the stream control protocol 180) in order to control the playback or presentation of the stream data 170 from the first stream server 120 to the client 130.

In step 201, during any use of the stream control protocol 180 between the client computer system 130 and the first stream server 120 (in either direction, client to server or server to client), the failover manager 150 operating within the data communications device 110 monitors operation of the stream control protocol 180 associated with the stream data 170. Details of the process of monitoring the operation of the stream control protocol 180 will be explained in later. Generally however, the failover manager 150 is able to maintain a stream state associated with the stream data 170 based on monitoring the operation of the stream control protocol 180. The failover manager 150 can use the stream state as will be explained to calculate a relative position 192 within the stream data 170 at any point in time (e.g., such as upon occurrence of a stream change event). As a brief example, if the stream control protocol is RTSP, the failover manager 150 can monitor RTSP message to keep track of the state of the stream data 170, such as determining and/or tracking a current normal play time of the stream data at any point in time.

In another embodiment, monitoring operation of the stream control protocol can include monitoring operation of the protocol actually used to transfer stream data, such as the RTP protocol. In such a case, the packet of RTP protocol encoded data can be monitored to obtain timing and/or sequencing information regarding the media to allow the failover manager 150 to track where in the media (e.g., at what time relative to the start of the media stream) the current transmission of stream data exists. In other words, monitoring RTSP can be used to gain insight into the control flow of the stream data, and monitoring of RTP information within the stream data packet 170 can be used to gain further information on exact play times of the stream data 170 during passage of this data through the data communications device 110 operating the failover manager 150. Other examples of stream transfer and control protocols that actually carry stream data as well are MPEG encoding techniques such as MPEG4 in which framing information is encoded within the stream data packet 170. In such cases, the monitoring operation of the stream control protocol includes monitoring the actual stream data packets 170 as the stream control protocol is "built into" such packet along with the stream data. Specific techniques for obtaining timing or framing information concerning a specific playback point in a media stream of data from the data encoded that is encoded with a stream control protocol such as RTP or MPEG are known to those skilled in the art.

Next, in step 202, the failover manager 150 detects a stream change event 185 related to the transmission of the stream data 170 between the client computer system 130 and the first stream server 120. As an example, the failover manager 150 operating within the data communications device 110 may detect a complete failure of the first stream server 120 or may detect an overload or a requirement to migrate stream transmission from the first stream server 120 to another stream server (e.g., 122) that is capable of handling transmission of the stream data 170. Techniques for detecting the failure of the first stream server 120 within the data communications device 110 are generally outside of the scope of the details of the present invention but may include such operations as detecting the absence of a heartbeat signal which is periodically transmitted from the first stream server 120 to the data communications device 110. Alternatively, the failover manager 150 may detect the lack or slowing of transmission of stream data 170 for a predetermined amount of time equal to a timeout in transmission of the stream data 170 (or below a minimum transfer rate). Other techniques may be used as well to allow the failover manager 150 to detect a stream change event 185 which indicates that transmission of the stream data 170 must now take place between the client computer system 130 and another stream server, such as the second stream server 122, due to the occurrence of the stream change event 185.

In step 203, the failover manager 150 identifies a relative position 192 such as a normal play time or byte offset position, absolute position or other location identifier within the stream data 170 based on the monitored operation of the stream control protocol 180. Specifics of one example of the operation of identifying the relative position 192 within the stream data 170 will be explained in detail later. Generally however as noted in the aforementioned example explained with respect to FIG. 1, the relative position 192 identifies a normal play time and/or position within the stream data 170 (e.g., relative to the beginning of the stream data 170) that corresponds to the stream change event 185. By monitoring the operation of the stream control protocol 180 (e.g., either RTSP, RTP or both), the failover manager 150 is able to continuously track the stream state of the stream data 170 and then upon detection of the stream change event 185, is able to compute or otherwise calculate the relative position 192.

Next, in step 204, the failover manager 150 establishes transmission of the stream data 170 between the client computer system 130 and a second stream server 122 starting at the relative position 192 within the stream data 170. This is illustrated in the example in FIG. 1 via the use of the stream establishment message 190 which in this example is generated by the failover manager 150 in step 204 in order to establish the transmission of the new stream data 170-B which represents all portions of stream data 170 beginning at the relative position 192 and continuing towards the end portion of the stream data 170-N. In other words, in step 204, the failover manager 150 creates the stream establishment message 190 (i.e., which may be in a format of a stream control protocol message 180-B, such as an RTSP PLAY request indicating the relative position to begin play) to instruct the second stream server 122 to begin serving the stream data 170 to the client computer system 130 at the relative position 192 (e.g., time or location) at which the first stream server 120 left off serving due to the stream change event 185.

Next, in step 205, the second stream server 122 resumes transmission of the stream data 170 between a second stream server 122 and the client computer system 130 as a result of receipt of the stream establishment message 190. this processing can happen rapidly such that the client computer system 130 experiences little or no loss of stream data 170 upon occurrence of the stream change event 185. Furthermore, the client computer system 130 need not be aware of the stream change event 185 and has no requirement to perform any additional or different processing as normally would occur in a client computer system 130 operating a stream control protocol 180 to control stream data 170. To this end, the client 130 does not need to even have knowledge that the stream data 170 is now being served by the second stream server 122 since the data communications device 110 can direct all traffic such as stream control protocol messages to the second stream server 122 by re-establishing the stream session state (e.g., an RTSP session state) with the second stream server 122 upon detecting the failure of the first stream server 120.

After processing step 205, once the failover manager 150 detects successful resumption of transmission of stream data 170 between the second stream server 122 and the client computer system 130, processing returns to step 201 to continue monitoring operation of the stream control protocol 180 in the event that the second stream server 122 experiences a stream change event requiring that transmission of the stream data 170 be resumed from yet another redundant stream server (not shown in this example) that is capable of serving the stream data 170.

As noted above, the data communications device 110 can handle the redirection or reincarnation of transmission of the stream data 170 from the first stream server 120 to the second stream server 122 using, for example, a technique such as performing a connection "handoff" by having the data communications device 110 to be aware of the state of the RTSP protocol and to use this awareness to re-establish the RTSP session state on the new second stream server 122.

Figure 3:
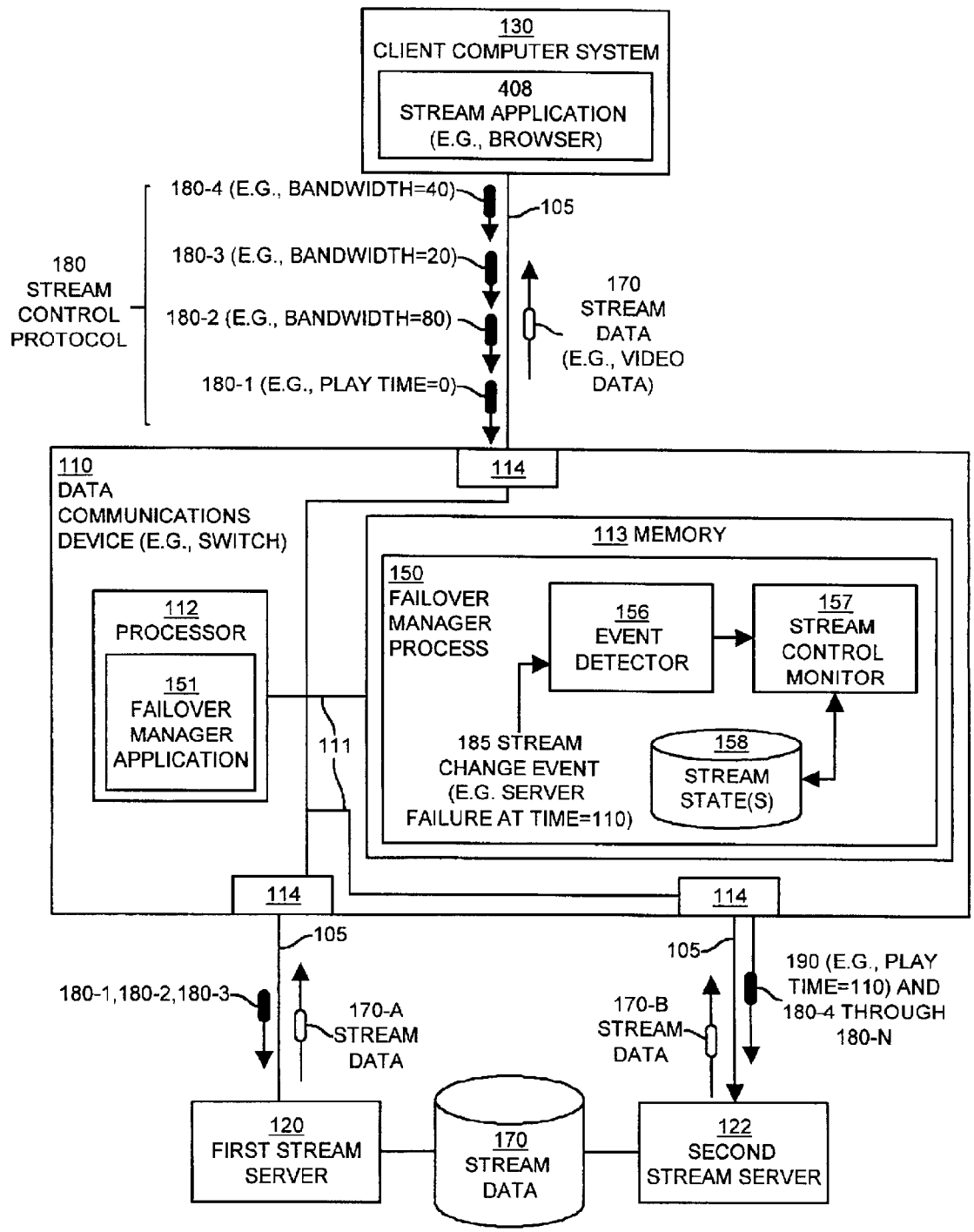
FIG. 3 illustrates an example architecture and data flow of operation of a failover manager within a data communications device configured according to one example embodiment of the invention.

FIG. 3 illustrates a more detailed architecture of a data communications device 110 configured according to one embodiment of the invention. FIG. 3 also illustrates a data flow diagram showing a more detailed example of how a client computer system can use a sequence of stream control protocol messages 180 in order to control the flow of stream data 170 which the first stream server 120 initially serves but which then, in response to a stream change event 185, is directed by the failover manager 150 to be served from the second stream server 122.

The data communications device 110 in this example embodiment of the invention includes an interconnection mechanism 111 such as a data bus or circuitry which interconnects a memory 112, a processor 113 and one or more communications interfaces 114. The memory 112 may be any type of volatile or non-volatile memory or storage system such as computer memory (e.g., random access memory (RAM), read-only memory (ROM), or another type of memory), disk memory (e.g., hard disk, floppy disk, optical storage and so forth). The memory 112 is encoded with logic instructions and/or data that form a failover manager application 151 configured according to embodiments of the invention. In other words, the failover manager application 151 represents software code, instructions and/or data that reside within memory or storage 112 or within any computer readable medium accessible to the data communications device 110. The processor 113 represents any type of circuitry or processing device such as a central processing unit or application-specific integrated circuit that can access the failover manager application 151 encoded within the memory 112 over the interconnection mechanism 111 in order to execute, run, interpret, operate or otherwise perform the failover manager application 151 logic instructions. Doing so forms the failover manager process 150. In other words, the failover manager process 150 (represented in FIG. 1 generally as the failover manager 150) represents one or more portions of the logic instructions of the failover manager application 151 while being executed or otherwise performed on, by or in the processor 113 within the data communications device 110.

The failover manager process 150 includes a number of components as illustrated in FIG. 3. In this example embodiment, the failover manager 150 includes an event detector 156, a stream control monitor 157 and one or more stream states 158 (e.g., data structures) that correspond to the respective states of one or more flows of stream data 170. Generally, the stream control monitor 157 performs the processing of step 201 discussed above with respect to FIG. 2 in order to monitor operation of the stream control protocol messages 180 passed between a stream server and the client computer system 130 and, based on such stream control protocol messages 180, maintains the stream states 158 related to each individual stream of stream data 170 (only one such stream shown in the examples discussed herein). The event detector 156 is responsible for detecting the stream change event related to the transmission of the stream data 170 (i.e., step 202 from FIG. 2).

In this example, some details of four different stream control protocol messages 180-1 through 180-4 are also illustrated to show how the client computer system 130 can adjust transmission characteristics of the stream data 170 provided by a stream server (e.g., one or 120 or 122) during transmission or serving of the stream data 170. In particular, the first stream control protocol bandwidth adjustment message 180-1 is a PLAY request message indicating to a stream server (i.e., the first stream server 120 in this example) to begin playing or serving the stream data 170 (which is video data in this example) and a normal play time or position equal to zero, which is equivalent to the beginning of the video data.

Figure 4:
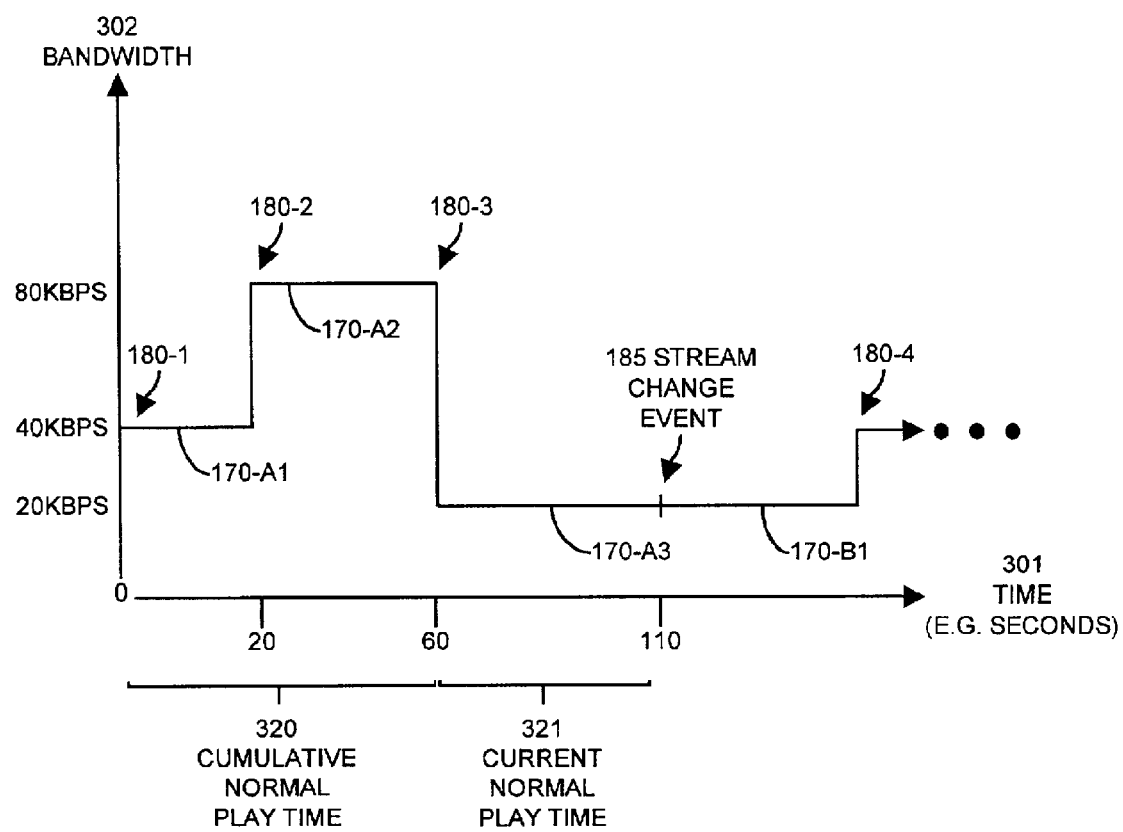
FIG. 4 illustrates a graph that indicates how a stream control protocol can adjust transmission of stream data transmitted between a stream server and a client computer system.

In response to receiving such a request, the first stream server 120 begins serving the stream data 170-A back to the client computer system 130, which in this example operates a stream application 408 (e.g., a software process) such as a web browser or video player program which is capable of receiving and reproducing the stream data 170 on behalf of a user controlling the client computer system 130. As some point in tie after the client computer system 130 instructs the first stream server 120 to play the stream data with the first stream control protocol message 180-1, the client provides another stream control protocol message 180-2 which in this example is a bandwidth adjustment message that sets the bandwidth of the stream data to a value of 80 kilobits per second (kbps). At some point after the bandwidth adjustment message 180-2, the client 130 provides another bandwidth adjustment message 180-3 in order to further adjust the bandwidth for the stream data 170 to 20 kbps. Finally in this example, at some point in time after sending the bandwidth adjustment message 180-3, the client computer system 130 provides yet another bandwidth adjustment message 1804 in order to further adjust the bandwidth of the stream data transmission 170 to 40 kbps. Directing attention now briefly to FIG. 4, this figure provides a graph that illustrates how the sequence of stream control protocol messages 180 (i.e., bandwidth adjustment messages 180-1 through 1804 from FIG. 3) effect the transmission of stream data 170 from the first stream server 120 up until a point in time of occurrence of the stream change event 185, and then thereafter with respect to the second stream server 122. In particular, the graph in FIG. 4 plots bandwidth 302 of the stream data 170 on the vertical axis in relation to time 301 in seconds on the horizontal axis. Furthermore, the graph shown in FIG. 4 illustrates different portions or amounts of stream data 170-A1 through 170-A3 and 170-B1 that are transmitted to the client 130 during elapsed time between receipt of the successive stream adjustment messages 180 by the stream server serving those portions of stream data 170.

To explain somewhat further, the first stream adjustment message 180-1 causes the first stream server 120 to begin serving stream data 170-A1 at a normal play time or position of zero (i.e., at the beginning of the stream data 170) and at a bandwidth of 40 kbps (e.g., possibly a default bandwidth when no bandwidth is specified in a play request). This transmission continues for a period of 20 seconds. After 20 seconds has elapsed of transmission of the stream data 170-A1 at a rate of 40 kbps, the client 130 transmits the second stream adjustment message 180-2 causing the first stream server 120 to begin transmitting the next successive portions of stream data 170-A2 at a rate of 80 kbps. This adjustment may occur perhaps because the stream application 408 senses a requirement for an increased bandwidth for receipt of the stream data 170. Transmission of stream data portions 170-A2 continues until 60 seconds of time elapses at which point the client 130 transmits the third stream or bandwidth adjustment message 180-3 causing the first stream server 120 to continue transmission of the stream data 170-A3 but now at a rate of 20 kbps. Thereafter, at a point 110 seconds into the transmission of the stream data 170, the stream change event 185 occurs such as a failure of the first stream server 120. Changes in the bandwidth of data transmission are typically accompanied by changes in the encoding rate of the data or fidelity of the media stream contents such that the fidelity matches the available network bandwidth. The encoding fidelity can also be changed in order to preserve perceptual quality. In the example in FIG. 4, the drop from 80 kbps to 20 kbps might be done at the request of the client if the user desires to adjust the fidelity of the stream data.

Upon occurrence of the stream change event 185, embodiments of the invention as explained herein the detect this event 185 and create the stream establishment message 190 (FIG. 3). The failover manager selects a new stream server and causes the second stream server 122 to receive the stream establishment message 190 which, as illustrated in FIG. 3, instructs the second stream server 122 to begin playing or serving the stream data portions 170-B1 (FIG. 4) at a normal play time position equal to 110 seconds into the stream data. In other words, the stream establishment message 190 illustrated in FIG. 3 instructs the second stream server 122 to begin transmission of stream data 170-B1 at the point where the first stream server 120 left off due to the occurrence of the stream change event 185. The client thus perceives no difference in receipt of the stream data 170.

Referring back to the data flow diagram in FIG. 3, at a later point in receipt of the stream data 170 by the client 130 (i.e., at a point in time after the stream change event 185), the client 130 issues the last stream control protocol message 1804 which the data communications device 110 now directs to the second stream server 122 in order to allow the client 130 to continue controlling transmission of stream data 170 which is now being served as stream data portions 170-B from the second stream server 122 after the stream change event 185.

FIGS. 3 and 4 thus illustrate how embodiments of the invention are capable of providing mid-stream failover of a real-time transmission of stream data 170 such that the stream application 408 operating within the client computer system 130 perceives little or no loss of stream data 170.

Figure 5:
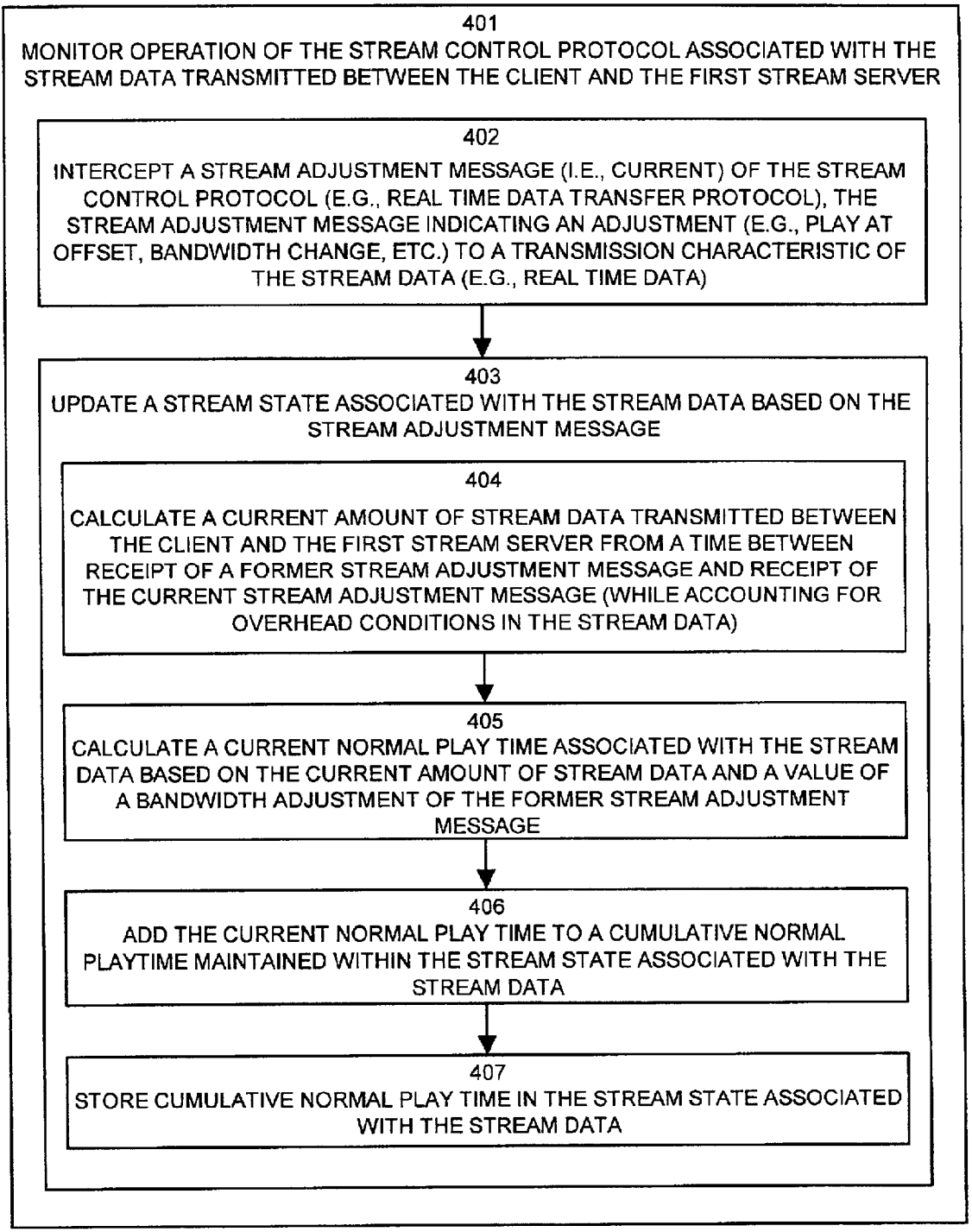
FIGS. 5 through 7 provide a flow chart showing the details of operation of a data communications device operating a failover manager according to one example embodiment of the invention.
Figure 6:
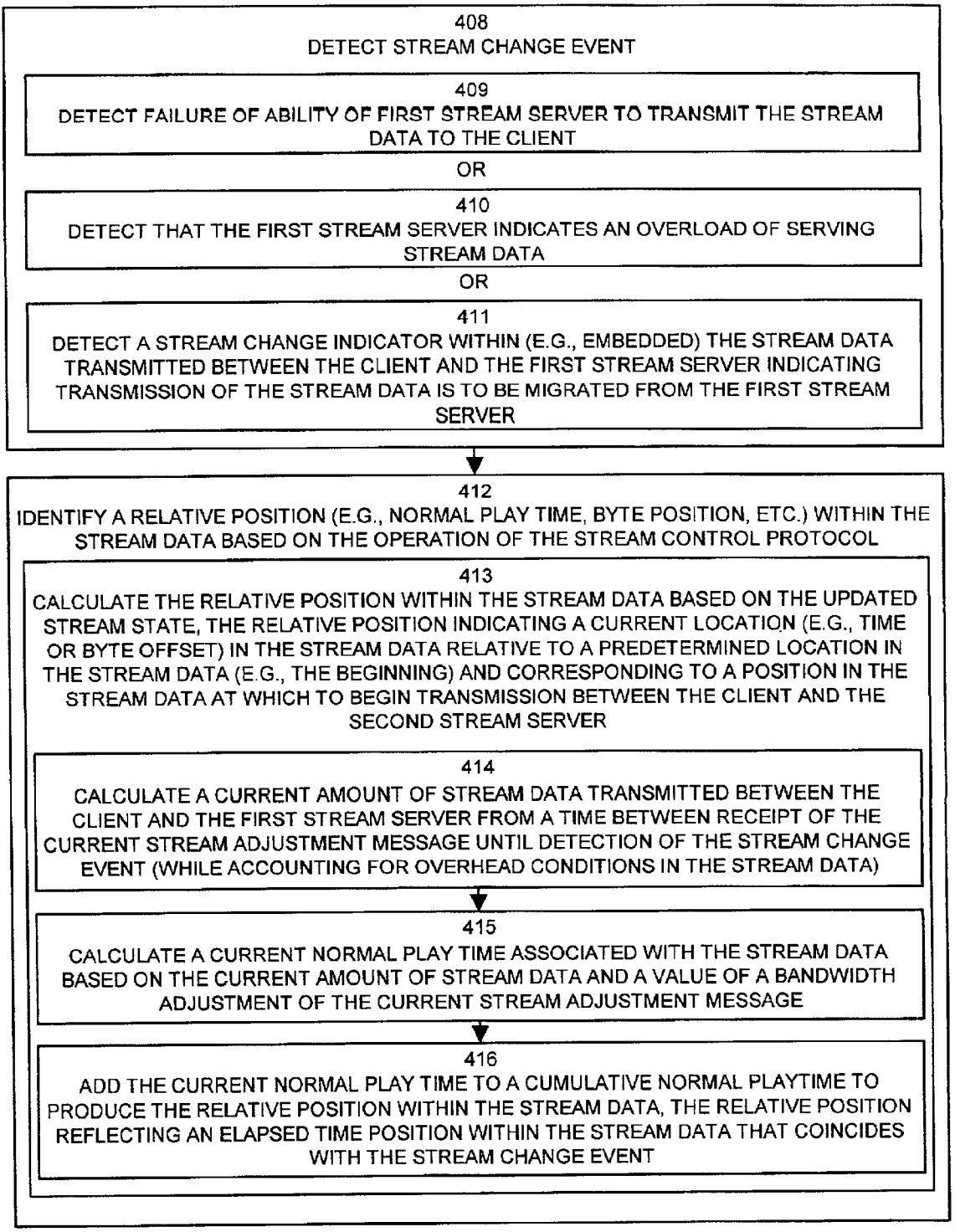
Figure 7:
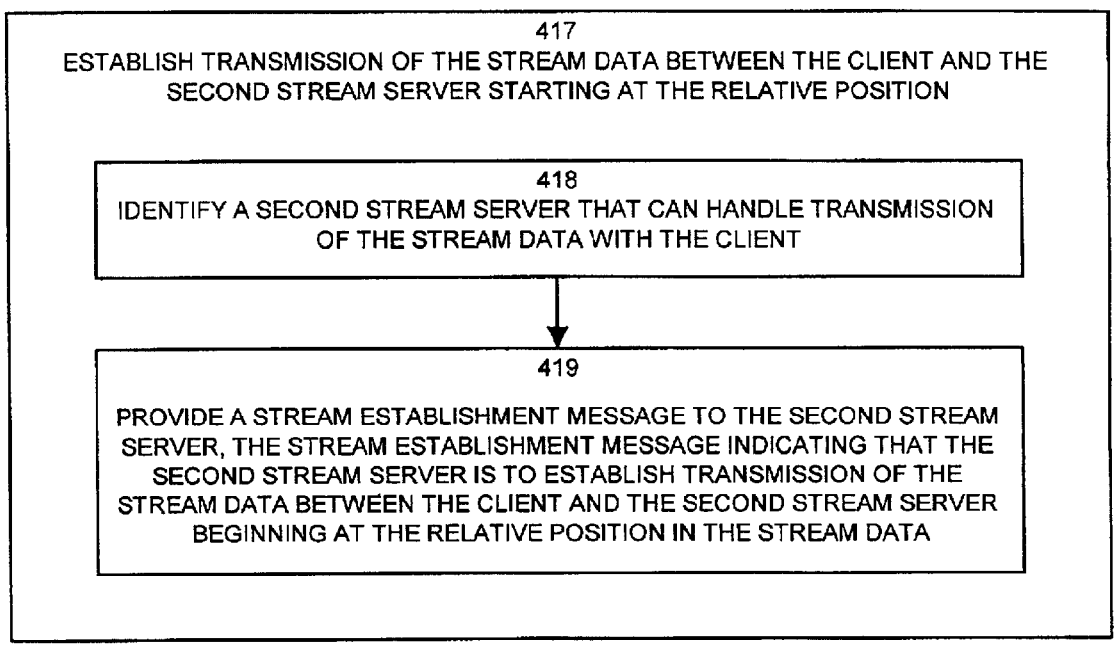

FIGS. 5 through 7 provide a flow chart of details of processing operations that transpire according to one example embodiment of the invention and explains further details of the failover manager processing as previously discussed with respect to FIG. 2.

In step 401 in FIG. 5, the failover manager process 150 monitors operation of the stream control protocol 180 associated with the stream data 170 transmitted between the client 130 and a first stream server 120. It is to be understood that for purposes of this invention, stream control protocol messages can go in both directions between the stream server and a client. In other words, the stream server 120 in the former examples can also issue stream control protocol messages 180 back to the client 130 which the stream control monitor 157 can detect and monitor in order to accurately maintain the stream state 158 associated with stream data 170.

Furthermore, embodiments of the invention are not limited to the stream server only serving data to the client computer system 130. In some situations, stream data may flow in both directions from a stream server to a client and from a client to a stream server. In either or both of these cases, the stream control monitor can monitor stream control protocol messages 180 traveling in both directions in order to control stream data for one or more stream traveling in either direction.

In step 402, the stream control monitor 157 within the failover manager process 150 intercepts a stream adjustment message 180 (referred to herein for this discussion as a "current" stream adjustment message) of the stream control protocol such as a real-time data transfer protocol (e.g., RTSP). The stream adjustment message 180 indicates an adjustment to a transmission characteristic of the stream data 170 such as an indication to play at a particular offset, normal play time or other location within the stream data. Such a message might also indicate a bandwidth change or other information as well. The stream data 170 may be real-time data or may be non-real-time data.

Next, in step 403, the stream control monitor 157 updates the stream state 158 associated with the stream data 170 based on the stream adjustment message 180 intercepted in step 402. Details of the processing of updating the stream state 158 will now be explained for one embodiment of the invention with respect to the processing steps 404 through 407 illustrated within step 403 in FIG. 5.

In step 404, the stream control monitor calculates a current amount of stream data transmitted between the client and the first stream server from a time between receipt of a former stream adjustment message and receipt of the current stream adjustment message. This calculation can include an accounting for overhead conditions within the stream data 170. Referring back to the example graph shown in FIG. 4, the processing of step 404 respectively calculates the amount of stream data (e.g., in bytes) of portions 170-A1, 170-A2, and so forth upon receipt of each respective stream adjustment message 180-2, 180-3. In this manner, the processing of step 404 can determine how much stream data (e.g., how many bytes, packets or other units) were transmitted since the last stream adjustment message upon receipt of the current stream adjustment message.

Next, in step 405, the stream control monitor 157 calculates a current normal play time associated with the stream data The current normal play time in this example embodiment is based upon the current amount of stream data (calculated in step 404) and a value of a bandwidth adjustment of the former stream adjustment message. As an example, referring back to the graph in FIG. 4, upon receipt of the stream adjustment message 180-2, the stream control monitor 157 can calculate or otherwise compute the current normal play time of the stream data 170 based upon the amount of stream data transmitted in this section or portion 170-A2 (as calculated in step 404) based upon the bandwidth setting of 80 kbps as specified by the former stream adjustment message 182. Stated differently, the stream control monitor 157 can compute a current normal play time for this segment of stream data 170-A2 once it calculates how much stream data has been transmitted in this segment and once it knows the bandwidth at which that amount of stream data stream was transmitted.

Thereafter, in step 406, the stream control monitor 157 adds the current normal play time (calculated step 405 for the most recent segment of stream data 170 transmitted at a particular bandwidth setting) to a cumulative normal play time maintained within the stream state 158 associated with the stream data 170. In other words, once the current normal play time of a particular segment of stream data 170, such as segment 170-A2 has been computed, the stream control monitor 157 can add this current normal play time to the cumulative normal play time representing former computations of current normal play times which occur upon receipt of each stream adjustment message 180.

One example calculation to compute the cumulative normal play time for the example graph of stream data transfer shown in FIG. 4 can appear as follows:

$$NPT\mathrel{+}=Bandwidth\_setting*data\_bytes*(1-header\_overhead)$$

Where NPT is the cumulative normal play time, and bandwidth_setting is the current value of the bandwidth setting at the time of calculation (i.e., the bandwidth setting between bandwidth rate change events), and data_bytes is the current total number of bytes of information transmitted during this "step" or bandwidth setting (i.e., since the last horizontal change in the graph) and wherein header_overhead is the percentage of overhead information associated with the total data bytes. Using this calculation, the normal play time can be computed for the stream data and added (i.e., +=) to any previously computer normal play time value to obtain the cumulative normal play time for the stream of data.

In step 407, the stream control monitor 157 stores the cumulative normal play time within the stream state 158 associated with the stream data 174 which the stream adjustment message 180 was received. In this manner, upon receipt of each stream adjustment message, the stream control monitor 157 can keep track of the current normal play time up to that point in transmission of the stream data 170.

After the processing steps 404 through 407 within step 403 are complete, the monitoring operation of the stream control protocol in step 401 is also complete in processing proceeds to step 408 beginning at the top of the flow chart in FIG. 6.

In step 408 in FIG. 6, the event detector 156 operating within the failover manager process 150 in the data communications device 110 detects a stream change event 185. Steps 409 through 411 illustrates examples of the types of processing that may be used to detect the stream change event 185.

In step 409, the event detector 156 may detect the stream change event by detecting a failure or the inability of the first stream server 120 to transmit the stream data 170 to the client 130. In other words, in step 409, the event detector can detect a failure of the first stream server.

In an alternative configuration, the event detector 156 can detect the stream change event by detecting that the first stream server 120 indicates an overload of serving stream data 170. This may happen perhaps if the first stream server 120 engages in serving many streams of data for which processing burdens required to serve such streams may overload the first stream server 120. Alternatively, the event detector may determine that the first stream server 120 is serving the stream data below a minimum bandwidth threshold indicating the server is overloaded.

In yet another alternative configuration a shown in step 411, the event detector 156 can detect the stream change event by detecting a stream change indicator within (e.g., embedded in) the stream data 170 transmitted between the client 130 and the first stream server 120. Such an embedded stream change indicator can indicate that transmission of the stream data 170 is to be migrated from the first stream server 120 to another stream server that is capable of handling transmission of the stream data 170 to the client computer system 130. In other words, according to this embodiment of the invention, if a stream server such as the first stream server 120 has a requirement to offload the serving of one or more streams of stream data 170, the first stream server 120 can embed, within the stream data 170, an indicator such as a flag within an unused field of a packet header of the stream data 170, which the event detector 156 can detect as the stream change event 185 when the stream data 170 passes through the data communications device 110.

Once the event detector 156 detects a stream change event 185, processing proceeds to step 412.

In step 412, the failover manager process 150 identifies a relative position 192 within the stream data 170 based upon the operation (i.e., based upon monitoring) the stream control protocol 180.

In particular, as shown in step 413, this processing involves calculating the relative position 192 within the stream data 170 based on the updated stream state 158 (as updated during the monitoring operation discussed with respect to FIGS. 2 and 5). The relative position 192 (FIG. 1) indicates a current location such as a time or normal play time or location offset into the stream data 170 relative to i) a predetermined location in the stream data 170 (e.g., such as the beginning of time of the stream data or the beginning played offset of the stream data file) and ii) that corresponds to a position in the stream data 170 at which to begin transmission between the client and the second stream server 122. In other words, the relative position 192 identifies the normal play time within the stream data at which the second stream server 122 to begin serving the stream data 170-B.

To calculate the relative position, in step 414, the failover manager process 150 calculates a current amount of stream data transmitted between the client and the first stream server 120 from a time between receipt of the current stream adjustment message (e.g., 180-3 in FIG. 4) until detection of the stream change event 185. In other words, referring to the example in FIG. 4, the processing of step 414 causes the failover manager process 150 to calculate the total amount of stream data transmitted in stream data segment 170-A3.

Next, in step 415, the failover manager process 150 calculates a current normal play time associated with the stream data 170 based upon the current amount of stream data (calculated in step 414) and a value of the bandwidth adjustment (e.g., adjustment to 20 kbps in FIG. 4) of the current stream adjustment message (e.g., 180-3 in FIG. 4). In other words, much like the processing of updating the stream state discussed above with respect to steps 404 and 405 in FIG. 5, steps 414 and 415 result in a computation of the current normal play time for the stream data portion 170-A3 using the example in FIG. 4.

Next, in step 416, the failover manager process 150 adds the current normal play time (calculated in step 415) to a cumulative normal play time within the stream state 158 in order to produce the relative position 192 within the stream data 170. Is a result of this processing, the relative position 192 reflects an elapsed time position (or played offset or other location) within the stream data 170 that coincides with the stream change event 185. Upon completion of the processing to identify the relative position 192 within the stream data at which the stream change event 185 occurred, processing proceeds to step 417 in FIG. 7.

In step 417, the failover manager process 150 establishes transmission of the stream data 170 between the client 130 and the second stream server 122 starting at the relative position 192 calculated as explained above.

In particular, in step 418, the failover manager process 150 identifies a second stream server 122 that is capable of handling transmission of the stream data 170 (i.e., that has access to the stream data and that is not overloaded) with the client computer system 130. In other words, in step 418, the failover manager process 150 makes a determination of the identity of another stream server such as the second stream server 122 in the former examples which is capable of effectively serving the same stream data 170 to the client computer system 130. As illustrated in the example in FIG. 3, each of the first and second stream servers 120 and 122 have access to the stream data 170. As a result, in this example, the failover manager process 150 selects the second stream server 122 within the processing of step 418 to serve as a redundant stream server.

Next, in step 419, the failover manager process 150 provides a stream establishment message 190 to the second stream server 122 (the server identified in step 418). The stream establishment message indicates that the second stream server 122 is to establish transmission of the stream data 170 between the client computer system 130 and the second stream server 122 beginning at the relative position computed within the stream data 170 that corresponds to the stream change event 185. In other words, the stream establishment message 190, as illustrated in FIG. 3, contains an indication of the normal play time (e.g., 192) at which to resume or continue transmission of the stream data 170 such that the client computer system 130 perceives little or no interruption in receipt of the stream data 170.

Using the aforementioned processing, embodiments of the invention are capable of providing real-time mid-stream failover for the transmission of stream data from stream servers to a client computer system receiving such streams. It is to be understood that the techniques of the invention can be applied to stream server computer systems which can serve multiple streams of data to multiple client computer systems.

As an example, the stream data 170 can comprise multiple flows of data. In such situations, the operation of identifying a relative position within the stream data identifies respective relative positions 192 within each flow of the stream data 170. That is, the monitoring operation of the stream control protocol 180 can monitor and maintain a steam state for each stream of data served by (to or from) each stream server. Then, upon detection of a stream change event, this relative position information for each separate stream or flow of data can be used to perform mid-stream failover as previously explained. In addition, the stream data may be real-time data transmitted from one or more stream servers to the client, or from one or more clients to one or more stream servers (e.g., perhaps the stream servers are recording information from a client) and the stream control protocol 180 may be real-time data transfer control protocol capable of allowing the client and first stream server to control flow of the stream data such that the client 130 can receive or send the stream data 170 from or to the first stream server in a real-time manner. In such cases, the previously explained operations of monitoring the stream control protocol, detecting a stream change event, identifying a relative position, and establishing transmission between another stream server are performed to allow a stream change event to cause transmission of the stream data to switch between the first stream server and a client to a second stream server and a client for each stream effected by the stream change event 185. In addition, the relative positions of each effected stream of stream data 170 can have respective relative positions 192-1, 192-2, etc. such that the flow of each effected stream is resumed in a manner that has the least impact or stream data loss upon the client computer system (s) 130.

Those skilled in the art will understand that there can be many variations made to the embodiments explained above while still achieving the same objective of those embodiments and the invention in general. For example, any type of stream control protocol 180 can be used with embodiments of the invention and such embodiments are not limited to implementation with RTSP. As another example variation, the failover manager process need not reside or operate within a data communications device within the path of the stream data 170. In other words, the failover manager process 150 can operate within any type of computerized device which can obtain access to stream control protocol messages 180. Such a remotely operating failover manager process can instruct a remotely located data communications device 110 to redirect stream flow via a stream establishment message to another stream server. Such variations are intended to be covered by the scope of this invention. As such, the foregoing description of embodiments of the invention are not intended to be limiting. Rather, any limitations to the invention are presented in the following claims.

What is claimed is:

1. A method for providing stream data to a client, the method comprising the steps of:

monitoring operation of a stream control protocol associated with stream data transmitted between a client and a first stream server;

detecting a stream change event related to transmission of the stream data between the client and the first stream server;

identifying a relative position within the stream data based on the monitored operation of the stream control protocol; and establishing transmission of the stream data between the client and a second stream server starting at the relative position in the stream data.

2. The method of claim 1 wherein the step of monitoring operation of a stream control protocol comprises the steps of:

intercepting a stream adjustment message of the stream control protocol, the stream adjustment message indicating an adjustment to a transmission characteristic of the stream data; and updating a stream state associated with the stream data based on the stream adjustment message.

3. The method of claim 2 wherein the step of identifying a relative position within the stream data comprises the step of:

calculating the relative position within the stream data based on the updated stream state, the relative position indicating a current location in the stream data relative to a predetermined location in the stream data and corresponding to a position in the stream data at which to begin transmission between the client and the second stream server upon establishing transmission of the stream data between the client and a second stream server.

4. The method of claim 3 wherein the stream adjustment message includes relative position information and wherein the step of updating a stream state comprises the steps of:
storing the relative position information in the stream state associated with the stream data.

5. The method of claim 3 wherein:
the steps of identifying a relative position within the stream data and establishing transmission of the stream data between the client and a second stream server are performed in response to the step of detecting a stream change event related to the first stream server; and
wherein the relative position within the stream data is a normal play time of the stream data identifying a time position within the stream data at which the step of establishing transmission of the stream data causes transmission of the stream data to be resumed between the client and the second stream server.

6. The method of claim 3 wherein:
the stream adjustment message is a current stream adjustment message that indicates a bandwidth adjustment to a bandwidth of transmission of the stream data between the client and the first stream server; and
wherein the step of updating a stream state associated with the stream data comprises the steps of:
calculating a current amount of stream data transmitted between the client and the first stream server from a time between receipt of a former stream adjustment message until receipt of the current stream adjustment message;
calculating an current normal play time associated with the stream data based on the current amount of stream data and a value of a bandwidth adjustment of the former stream adjustment message;
adding the current normal play time to a cumulative normal play time maintained within the stream state associated with the stream data; and
storing the cumulative normal play time in the stream state associated with the stream data.

7. The method of claim 6 wherein:
the steps of identifying a relative position within the stream data and establishing transmission of the stream data between the client and a second stream server are performed in response to the step of detecting a stream change event related to the first stream server;
the step of calculating the relative position within the stream data based on the updated stream state comprises the steps of:
calculating a current amount of stream data transmitted between the client and the first stream server from a time between receipt of the current stream adjustment message until detection of the stream change event;
calculating a current normal play time associated with the stream data based on the current amount of stream data and a value of a bandwidth adjustment of the current stream adjustment message; and
adding the current normal play time to the cumulative normal play time to produce the relative position with the stream data, the relative position reflecting an elapsed time position within the stream data that coincides with the stream change event.

8. The method of claim 7 wherein the step of establishing transmission of the stream data between the client and a second stream server starting at the relative position in the stream data comprises the steps of:
identifying a second stream server that can handle transmission of the stream data with the client; and
providing a stream establishment message to the second stream server, the stream establishment message indicating that the second stream server is to establish transmission of the stream data between the client and the second stream server beginning at the relative position in the stream data.

9. The method of claim 7 wherein the stream data is transmitted from the first stream server to the client and wherein the step of detecting a stream change event comprises the step of:
detecting a failure of the ability of the first stream server to transmit the stream data to the client.

10. The method of claim 7 wherein the stream data is transmitted from the first stream server to the client and wherein the step of detecting a stream change event comprises the step of:
detecting that the first stream server indicates an overload of serving stream data; and
wherein the steps of identifying a relative position within the stream data and establishing transmission of the stream data between the client and a second stream server cause the transmission of stream data to be migrated from between the client and the first stream server to between the client and the second stream server.

11. The method of claim 7 wherein the step of detecting a stream change event comprises the step of:
detecting a stream change indicator within the stream data transmitted between the client and the first stream server.

12. The method of claim 7 wherein the steps of calculating a current amount of stream data transmitted between the client and the first stream server comprise the step of:
calculating an amount of stream data transmitted between the client and the first stream server while accounting for overhead conditions in the stream data.

13. The method of claim 1 wherein the stream data comprises multiple flows of data and wherein the step of identifying a relative position within the stream data comprises the step of identifying respective relative positions within the stream data for each flow of data.

14. The method of claim 1:
wherein the stream data is real time data transmitted from the first stream server to the client;
wherein the stream control protocol is a real time data transfer control protocol capable of allowing the client and the first stream server to control the flow of the stream data such that the client can receive the stream data from the first stream server in a real-time manner; and
wherein the steps of monitoring, detecting, identifying and establishing are performed to:
i) allow a stream change event to cause transmission of the stream data to switch between the first stream server and the client to the second stream server and the client; and
ii) to begin transmission of the stream data from the second stream server to the client at the relative position which corresponds approximately to a time location in the stream data that corresponds to the stream change event.

15. A computerized device comprising:

at least one communications interface;

a memory;

a processor; and an interconnection mechanism coupling the at least one communications interface, the memory and the processor;

wherein the memory is encoded with a failover manager application that when performed on the processor, produces a failover manager process that causes the computerized device to enable stream data to be provided to a client by performing the operations of:

monitoring operation of a stream control protocol associated with stream data transmitted between a client and a first stream server;

detecting a stream change event related to transmission of the stream data between the client and the first stream server;

identifying a relative position within the stream data based on the monitored operation of the stream control protocol; and establishing transmission of the stream data between the client and a second stream server starting at the relative position in the stream data.

16. The computerized device of claim 15 wherein when the failover manager process performs the operation of monitoring operation of a stream control protocol the failover manager process performs the operations of:

intercepting a stream adjustment message of the stream control protocol, the stream adjustment message indicating an adjustment to a transmission characteristic of the stream data; and updating a stream state associated with the stream data based on the stream adjustment message.

17. The computerized device of claim 16 wherein when the failover manager process performs the operation of identifying a relative position within the stream data the failover manager process performs the operation of:

calculating the relative position within the stream data based on the updated stream state, the relative position indicating a current location in the stream data relative to a predetermined location in the stream data and corresponding to a position in the stream data at which to begin transmission between the client and the second stream server upon establishing transmission of the stream data between the client and a second stream server.

18. The computerized device of claim 17 wherein the stream adjustment message includes relative position information and wherein when the failover manager process performs the operation of updating a stream state, the failover manager process performs the operation of:

storing the relative position information in the stream state associated with the stream data.

19. The computerized device of claim 17 wherein:

the operations of identifying a relative position within the stream data and establishing transmission of the stream data between the client and a second stream server are performed by the failover manager process in response to the operation of detecting a stream change event related to the first stream server; and wherein the relative position within the stream data is a normal play time of the stream data identifying a time position within the stream data at which the operation of establishing transmission of the stream data causes transmission of the stream data to be resumed between the client and the second stream server.

20. The computerized device of claim 17 wherein:

the stream adjustment message is a current stream adjustment message that indicates a bandwidth adjustment to a bandwidth of transmission of the stream data between the client and the first stream server; and wherein when the failover manager process performs the operation of updating a stream state associated with the stream data the failover manager process performs the operations of:

calculating a current amount of stream data transmitted between the client and the first stream server from a time between receipt of a former stream adjustment message until receipt of the current stream adjustment message;

calculating an current normal play time associated with the stream data based on the current amount of stream data and a value of a bandwidth adjustment of the former stream adjustment message;

adding the current normal play time to a cumulative normal play time maintained within the stream state associated with the stream data; and storing the cumulative normal play time in the stream state associated with the stream data.

21. The computerized device of claim 20 wherein;

the operations of identifying a relative position within the stream data and establishing transmission of the stream data between the client and a second stream server are performed in response to the operation of detecting a stream change event related to the first stream server; and wherein when the failover manager process performs the operation of the calculating the relative position within the stream data based on the updated stream state, the failover manager process performs the operations of:

calculating a current amount of stream data transmitted between the client and the first stream server from a time between receipt of the current stream adjustment message until detection of the stream change event;

calculating a current normal play time associated with the stream data based on the current amount of stream data and a value of a bandwidth adjustment of the current stream adjustment message; and adding the current normal play time to the cumulative normal play time to produce the relative position with the stream data, the relative position reflecting an elapsed time position within the stream data that coincides with the stream change event.

22. The computerized device of claim 21 wherein when the failover manager process performs the operation of establishing transmission of the stream data between the client and a second stream server starting at the relative position in the stream data the failover manager process performs the operation of:

identifying a second stream server that can handle transmission of the stream data with the client; and providing a stream establishment message to the second stream server, the stream establishment message indicating that the second stream server is to establish transmission of the stream data between the client and the second stream server beginning at the relative position in the stream data.

23. The computerized device of claim 21 wherein the stream data is transmitted from the first stream server to the client and wherein when the failover manager process performs the operation of detecting a stream change event the failover manager process performs the operation of:
- detecting a failure of the ability of the first stream server to transmit the stream data to the client.

24. The computerized device of claim 21 wherein the stream data is transmitted from the first stream server to the client and wherein when the failover manager process performs the operation of detecting a stream change event the failover manager process performs the operation of:
- detecting that the first stream server indicates an overload of serving stream data; and
- wherein the operations of identifying a relative position within the stream data and establishing transmission of the stream data between the client and a second stream server cause the transmission of stream data to be migrated from between the client and the first stream server to between the client and the second stream server.

25. The computerized device of claim 21 wherein when the failover manager process performs the operation of detecting a stream change event the failover manager process performs the operation of:
- detecting a stream change indicator within the stream data transmitted between the client and the first stream server.

26. The computerized device of claim 21 wherein when the failover manager process performs the operation of calculating a current amount of stream data transmitted between the client and the first stream server, the failover manager process performs the operation of:
- calculating an amount of stream data transmitted between the client and the first stream server while accounting for overhead conditions in the stream data.

27. The computerized device of claim 15 wherein the stream data comprises multiple flows of data and wherein when the failover manager process performs the operation of identifying a relative position within the stream data the failover manager process performs the operation of identifying respective relative positions within the stream data for each flow of data.

28. The computerized device of claim 15:
- wherein the stream data is real time data transmitted from the first stream server to the client;
- wherein the stream control protocol is a real time data transfer control protocol capable of allowing the client and the first stream server to control the flow of the stream data such that the client can receive the stream data from the first stream server in a real-time manner; and
- wherein when the failover manager process performs the operations of monitoring, detecting, identifying and establishing, the failover manager process performs such operations to:
  - i) allow a stream change event to cause transmission of the stream data to switch between the first stream server and the client to the second stream server and the client; and
  - ii) to begin transmission of the stream data from the second stream server to the client at the relative position which corresponds approximately to a time location in the stream data that corresponds to the stream change event.

29. A computer program product having a computer-readable medium including computer program logic encoded thereon that, when performed on a processor in a computerized device having a coupling of a memory, a processor, and at least one communications interface provides a method for providing stream data to a client by performing the operations of:
- monitoring operation of a stream control protocol associated with stream data transmitted between a client and a first stream server;
- detecting a stream change event related to transmission of the stream data between the client and the first stream server;
- identifying a relative position within the stream data based on the operation of the stream control protocol; and
- establishing transmission of the stream data between the client and a second stream server starting at the relative position in the stream data.

30. A computerized device comprising:
- at least one communications interface;
- a memory;
- a processor; and
- an interconnection mechanism coupling the at least one communications interface, the memory and the processor,
- wherein the memory is encoded with a failover manager application that when performed on the processor, produces a means to enable stream data to be provided to a client, such means including:
- means for monitoring operation of a stream control protocol associated with stream data transmitted between a client and a first stream server;
- means for detecting a stream change event related to transmission of the stream data between the client and the first stream server;
- means for identifying a relative position within the stream data based on the monitored operation of the stream control protocol; and
- means for establishing transmission of the stream data between the client and a second stream server starting at the relative position in the stream data.

* * * * *